United States Patent
Yim et al.

(10) Patent No.: US 9,934,253 B2
(45) Date of Patent: Apr. 3, 2018

(54) METHOD AND APPARATUS FOR DISPLAYING IMAGE IN MOBILE TERMINAL

(71) Applicant: Samsung Electronics Co., Ltd., Gyeonggi-do (KR)

(72) Inventors: Sae-Mee Yim, Gyeonggi-do (KR); Doo-Suk Kang, Gyeonggi-do (KR); Geon-Soo Kim, Gyeonggi-do (KR); Chang-Ho Lee, Gyeonggi-do (KR); Bo-Kun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 253 days.

(21) Appl. No.: 14/298,155

(22) Filed: Jun. 6, 2014

(65) Prior Publication Data
US 2014/0379749 A1 Dec. 25, 2014

(30) Foreign Application Priority Data
Jun. 20, 2013 (KR) ........................ 10-2013-0070767

(51) Int. Cl.
- *G06F 17/30* (2006.01)
- *H04L 9/32* (2006.01)
- *G06Q 10/10* (2012.01)
- *G06Q 50/00* (2012.01)
- *G06F 3/0481* (2013.01)

(52) U.S. Cl.
CPC ...... *G06F 17/30277* (2013.01); *G06F 3/0481* (2013.01); *G06Q 10/10* (2013.01); *G06Q 50/01* (2013.01); *H04L 9/32* (2013.01)

(58) Field of Classification Search
CPC ......... G06F 17/30268; G06F 17/30253; G06F 17/30247; G06F 17/30; G06F 17/3002; H04L 9/32
See application file for complete search history.

(56) References Cited

U.S. PATENT DOCUMENTS

| | | | | |
|---|---|---|---|---|
| 7,908,554 | B1 * | 3/2011 | Blattner | G06Q 10/107 715/706 |
| 8,606,576 | B1 * | 12/2013 | Barr | G10L 15/22 379/88.01 |
| 2008/0026736 | A1 * | 1/2008 | Funabashi | H04M 1/27455 455/415 |

(Continued)

FOREIGN PATENT DOCUMENTS

| | | |
|---|---|---|
| KR | 1020110055124 | 5/2011 |
| KR | 1020110062383 | 6/2011 |

OTHER PUBLICATIONS

Jan Kluczniok, "Samsung Galaxy S3: Intelligente Bedienfunktionen im Uberblick", NETZWELT, XP055149408, May 7, 2012.

(Continued)

*Primary Examiner* — Bruce M Moser
(74) *Attorney, Agent, or Firm* — The Farrell Law Firm, P.C.

(57) ABSTRACT

An apparatus and method for displaying an image in a mobile terminal are provided. One or more images are selected from among a plurality of pre-stored images, based on information about a party other than the user of the mobile terminal, stored in a phone book, and information about an event that is currently executed in the mobile terminal, and the selected images are preferentially displayed.

16 Claims, 13 Drawing Sheets

(56) References Cited

U.S. PATENT DOCUMENTS

| | | | |
|---|---|---|---|
| 2008/0215884 A1* | 9/2008 | Yonemoto | H04N 7/147 |
| | | | 713/168 |
| 2011/0038512 A1* | 2/2011 | Petrou | G06F 17/30256 |
| | | | 382/118 |
| 2011/0087674 A1 | 4/2011 | Schokking et al. | |
| 2011/0134276 A1 | 6/2011 | Choi | |
| 2012/0148120 A1* | 6/2012 | Yagi | G06K 9/033 |
| | | | 382/118 |
| 2012/0215771 A1 | 8/2012 | Steiner | |
| 2012/0265703 A1* | 10/2012 | Basra | G06Q 10/10 |
| | | | 705/319 |
| 2012/0290589 A1* | 11/2012 | Kubo | G06F 17/30259 |
| | | | 707/752 |
| 2013/0198210 A1* | 8/2013 | Lee | G06F 17/30861 |
| | | | 707/755 |
| 2013/0254232 A1* | 9/2013 | Reimer | G06F 17/30029 |
| | | | 707/772 |
| 2014/0351350 A1* | 11/2014 | Lee | H04L 51/16 |
| | | | 709/206 |

OTHER PUBLICATIONS

Andrew King, "How to Set Up S Beam and Social Tag on the Galaxy S3 and S3 Mini", XP055149415, Jul. 8, 2012.
European Search Report dated Nov. 5, 2014 issued in counterpart application No. 14173277.6-1955.

* cited by examiner

METHOD AND APPARATUS FOR DISPLAYING IMAGE IN MOBILE TERMINAL

PRIORITY

This application claims priority under 35 U.S.C. § 119(a) to a Korean patent application filed on Jun. 20, 2013 in the Korean Intellectual Property Office and assigned Serial No. 10-2013-0070767, the contents of which are incorporated herein by reference.

BACKGROUND OF THE INVENTION

1. Field of the Invention

The present invention relates generally to a mobile terminal, and more particularly, to a method and apparatus for displaying an image in a mobile terminal.

2. Description of the Related Art

Mobile terminals, such as smart phones and tablet Personal Computers (PCs), provide users with various useful functions through various applications. Accordingly, the mobile terminal has evolved to a device capable of using various types of information in addition to a voice call function. For example, a mobile terminal now provides a function of classifying and displaying a plurality of images stored in a gallery based on such information as the location of the mobile terminal.

The function of classifying and displaying images classifies a plurality of pre-stored images based on several criteria, and displays the classified images in the same order at a specific location or time.

Accordingly, the pre-stored images are statically displayed, causing a user to experience the inconvenience of having to input a specific gesture in order to find his/her desired image from among the displayed images.

SUMMARY OF THE INVENTION

Aspects of the present invention are to address at least the above-mentioned problems and/or disadvantages and to provide at least the advantages described below. Accordingly, an aspect of the present invention is to provide an apparatus and method for displaying images, such that a user can quickly find his/her desired image from among the displayed images.

Another aspect of the present invention is to provide an apparatus and method for displaying images based on a phone book and information regarding a currently executed event, such that a user can quickly find his/her desired image from among the displayed images.

In accordance with an aspect of the present invention, there is provided an apparatus of displaying an image in a mobile terminal, including a display unit configured to display one or more images, and a controller configured to select the one or more images from among a plurality of pre-stored images, based on information about the other party, stored in a phone book, and information about an event that is currently executed in the mobile terminal, and to preferentially display the selected images.

In accordance with another aspect of the present invention, there is provided a method of displaying an image in a mobile terminal, including selecting one or more images from among a plurality of pre-stored images, based on information about the other party, stored in a phone book, and information about an event that is currently executed in the mobile terminal; and preferentially displaying the selected images.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding, but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise.

A terminal according to embodiments of the present invention includes a mobile terminal and an electronic device having low mobility. In this disclosure, the electronic device having low mobility may be a PC, the mobile terminal is a portable, mobile electronic device, and may be a video phone, a mobile phone, a smart phone, International Mobile Telecommunication 2000 (IMT-2000), a Wideband Code Division Multiple Access (WCDMA) terminal, a Universal Mobile Telecommunication Service (UMTS) terminal, a Personal Digital Assistant (PDA), a Mobile Multimedia Player (PMP), a Digital Multimedia Broadcasting (DMB) terminal, E-Book, Notebook, a Tablet PC, or a digital camera.

Figure 1:
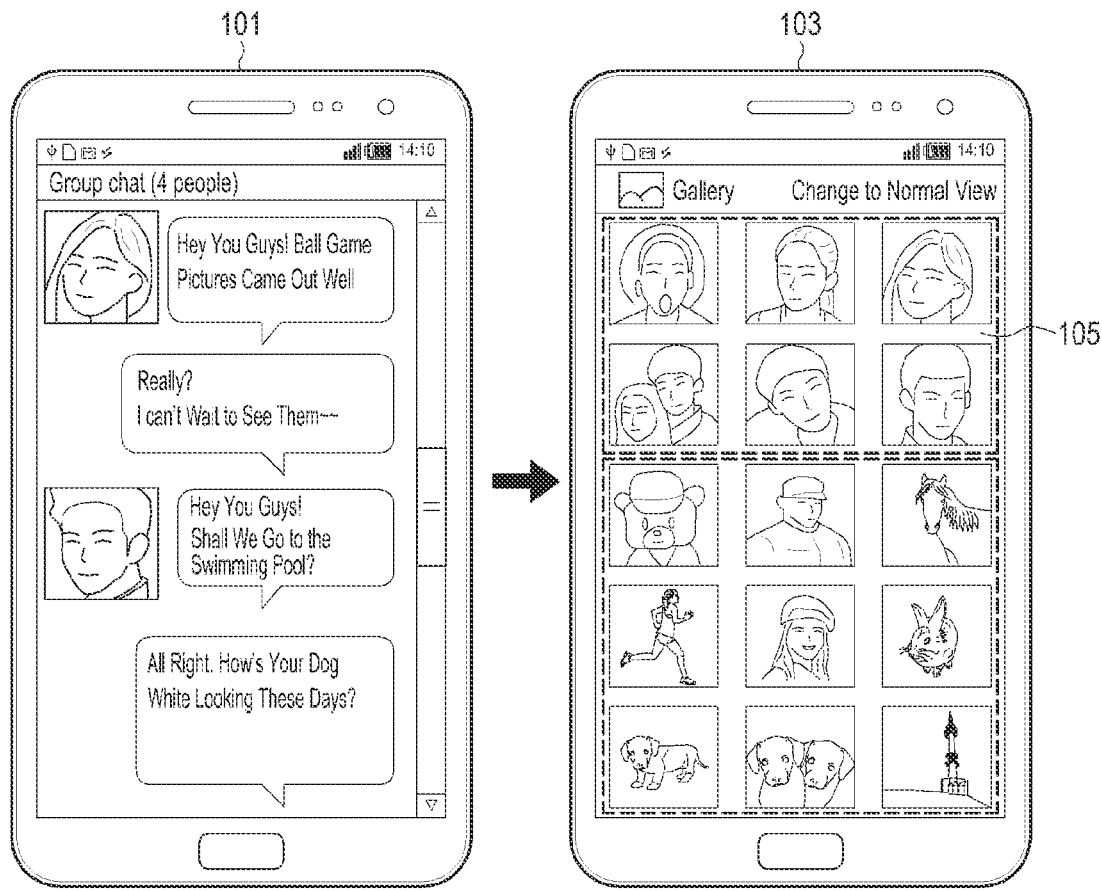
FIG. 1 illustrates screens on which images are displayed, according to a first embodiment of the present invention.

FIG. 1 illustrates screens on which images are displayed, according to a first embodiment of the present invention.

Referring to FIG. 1, a mobile terminal transmits/receives messages to/from a plurality of other parties through a messaging application such as Kakao Talk®, which is illustrated in screen 101. Herein, the messaging application enables a user to transmit/receive messages to/from at least another party, and includes Kakao Talk®, Facebook®, Twitter®, MyPeople®, and E-mail.

If a request for displaying pictures is received from a user, the mobile terminal determines whether there are one or more images corresponding to the other parties' IDentifiers (IDs) registered in the messaging application. If one or more images corresponding to the other parties' IDs are found, the mobile terminal extracts face images corresponding to the other parties from the found images using an image processing technique. The image processing technique involves extracting a face image based on changes in color of pixels included in an image. The mobile terminal searches for one or more images stored in a memory unit of the mobile terminal, and searches for one or more images including at least one of the extracted face images in the found images.

If no image corresponding to the other parties' IDs is found, the mobile terminal searches for the other parties' names corresponding to the other parties' IDs, and searches for one or more images corresponding to the other parties' names in the images stored in the memory unit.

As illustrated in screen 103, the mobile terminal preferentially displays the found images in the upper region 105 of screen 103, and sequentially displays the remaining images except for the images including at least one of the extracted face images among the images stored in the memory unit.

If a plurality of images has been found, the mobile terminal preferentially displays a latest image among the found images based on times at which the individual images have been taken. For example, as illustrated in screen 103, if six images have been found, the mobile terminal may display the six images in the order of later times at which the individual images have been taken, from the upper left area to the lower right area in the upper region 105.

Figure 2:
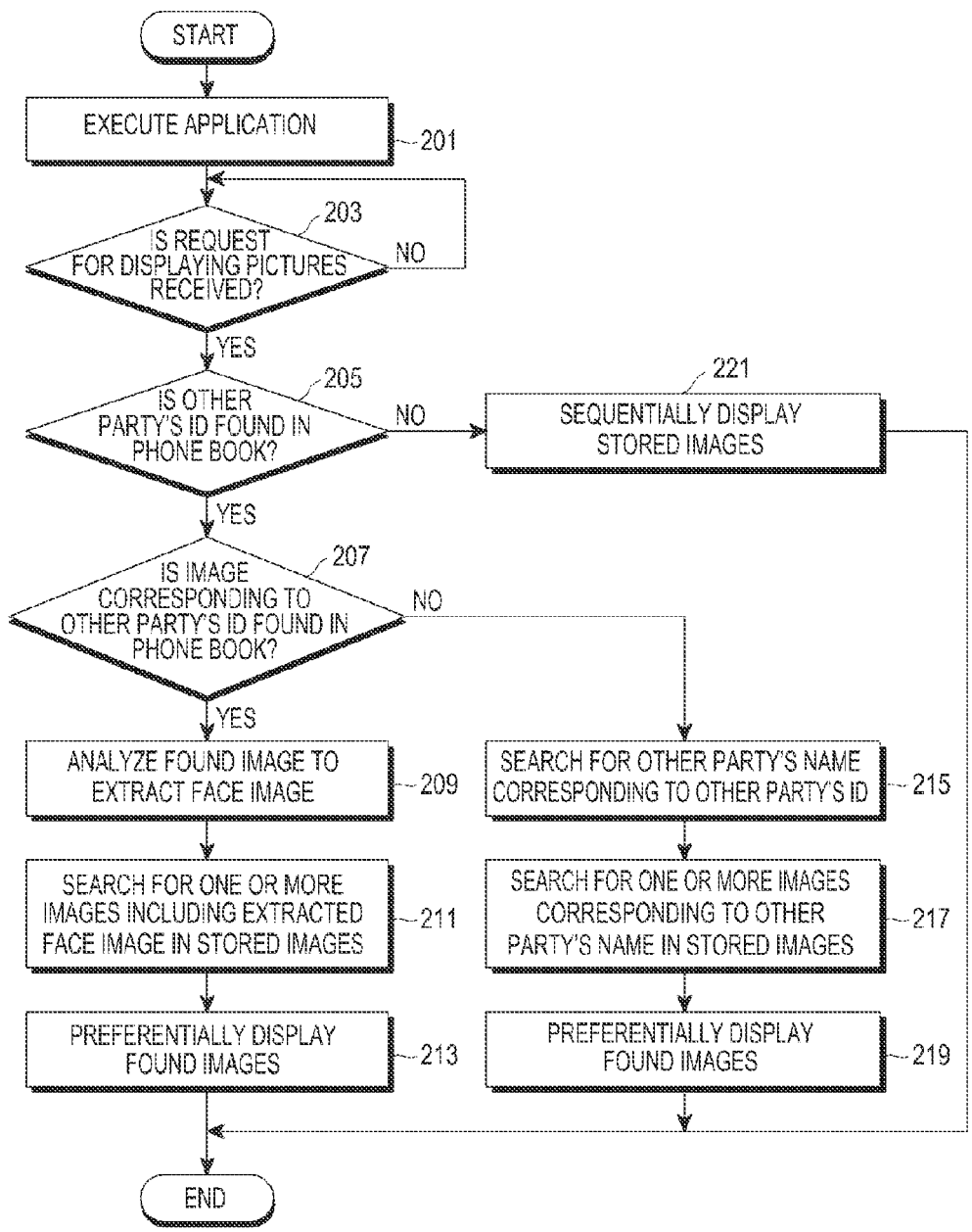
FIG. 2 is a flowchart of a method of displaying images in a mobile terminal, according to a first embodiment of the present invention.

FIG. 2 is a flowchart of a method of displaying images in a mobile terminal, according to the first embodiment of the present invention.

Referring to FIG. 2, in step 201, the mobile terminal executes a messaging application, contacts at least another party through the messaging application, and then proceeds to step 203. Herein, the messaging application is for enabling a user to transmit/receive messages to/from the other party, and includes Kakao Talk, Facebook, Twitter, MyPeople, and E-mail. For example, if the messaging application is Kakao Talk, the mobile terminal may provide a user with a group chatting function by which the user can chat with two or more other parties, which is illustrated in screen 101 of FIG. 1.

In step 203, the mobile terminal determines whether a request for displaying pictures is received from the user. If transmission of an image is requested by the user while the messaging application is executed, if a picture management application is executed by the user while the messaging application is executed, or if uploading of an image is requested by the user while the messaging application is executed, the mobile terminal determines that a request for displaying pictures has been received from the user. The picture management application is (e.g., a gallery) for managing at least one pre-stored image.

If the mobile terminal determines that a request for displaying pictures has been received, the mobile terminal proceeds to step 205. Otherwise, the mobile terminal continues to perform step 203.

In step 205, the mobile terminal searches for at least another party's ID, and determines whether the other party's ID is found in a phone book. The phone book may include the other party's name, the other party's phone number corresponding to the other party's name, the other party's ID corresponding to the other party's name and used in the messaging application, and an image corresponding to the other party's name.

If the other party's ID is found in the phone book, the mobile terminal proceeds to step 207. Otherwise, the mobile terminal proceeds to step 221. In step 221, the mobile terminal sequentially displays one or more images stored therein.

In step 207, the mobile terminal determines whether an image corresponding to the other party's ID is found in the phone book. If an image corresponding to the other party's ID is found in the phone book, the mobile terminal proceeds to step 209. Otherwise, the mobile terminal proceeds to step 215.

In step 209, the mobile terminal detects the image corresponding to the other party's ID, extracts a face image from the detected image using an image processing technique, and then proceeds to step 211. The image processing technique is for extracting a face image based on changes in color of pixels included in an image. In step 211, the mobile terminal compares the extracted face image to the images stored in the mobile terminal to search for one or more images including the extracted face image in the stored images, and then proceeds to step 213.

In step 213, the mobile terminal preferentially displays the found images (that is, images corresponding to the other party's face image) among the stored images, and sequentially displays the remaining images except for the found images among the stored images.

The mobile terminal determines whether any one(s) of the found images is already shared with the other party, based on a share log. The share log includes the other party's ID, and a shared image ID list corresponding to the other party's ID and informing of images already shared with the other party's ID. If the mobile terminal determines that there is at least one shared image, the mobile terminal preferentially displays at least one image except for the shared image among the found images. The mobile terminal sequentially displays the remaining images except for the displayed image among the stored images. The mobile terminal may display the shared image for the last time.

If a plurality of images has been found, the mobile terminal preferentially displays a latest image among the found images based on times at which the individual images have been taken. For example, as illustrated in screen 103, if six images have been found, the mobile terminal may display the six images in the order of (that is, order beginning with) later times at which the individual images have been taken, from the upper left area to the lower right area in the upper region 105.

In step 215, the mobile terminal searches for the other party's name corresponding to the other party's ID in the phone book, searches for one or more images corresponding to the other party's name in step 217, and then proceeds to step 219. The mobile terminal may analyze metadata of the stored images to determine whether the analyzed metadata of each image includes the other party's name, and determine that the corresponding image is an image corresponding to the other party's name if the analyzed metadata of the image includes the other party's name.

In step 219, the mobile terminal preferentially displays the found images (that is, images corresponding to the other party's name) among the stored images, and sequentially displays the remaining images except for the found images among the stored images.

The mobile terminal determines whether any one(s) of the found images is an image already shared with the other party, based on a share log. If the mobile terminal determines that there is at least one shared image, the mobile terminal preferentially displays at least one image except for the shared image among the found images. The mobile terminal sequentially displays the remaining images except for the displayed image among the stored images. The mobile terminal may display the shared image for the last time.

If a plurality of images has been found, the mobile terminal preferentially displays a latest image among the found images based on times at which the individual images have been taken. For example, as illustrated in screen 103, if six images have been found, the mobile terminal may display the six images in the order of later times at which the individual images have been taken, from the upper left area to the lower right area in the upper region 105.

Figure 3:
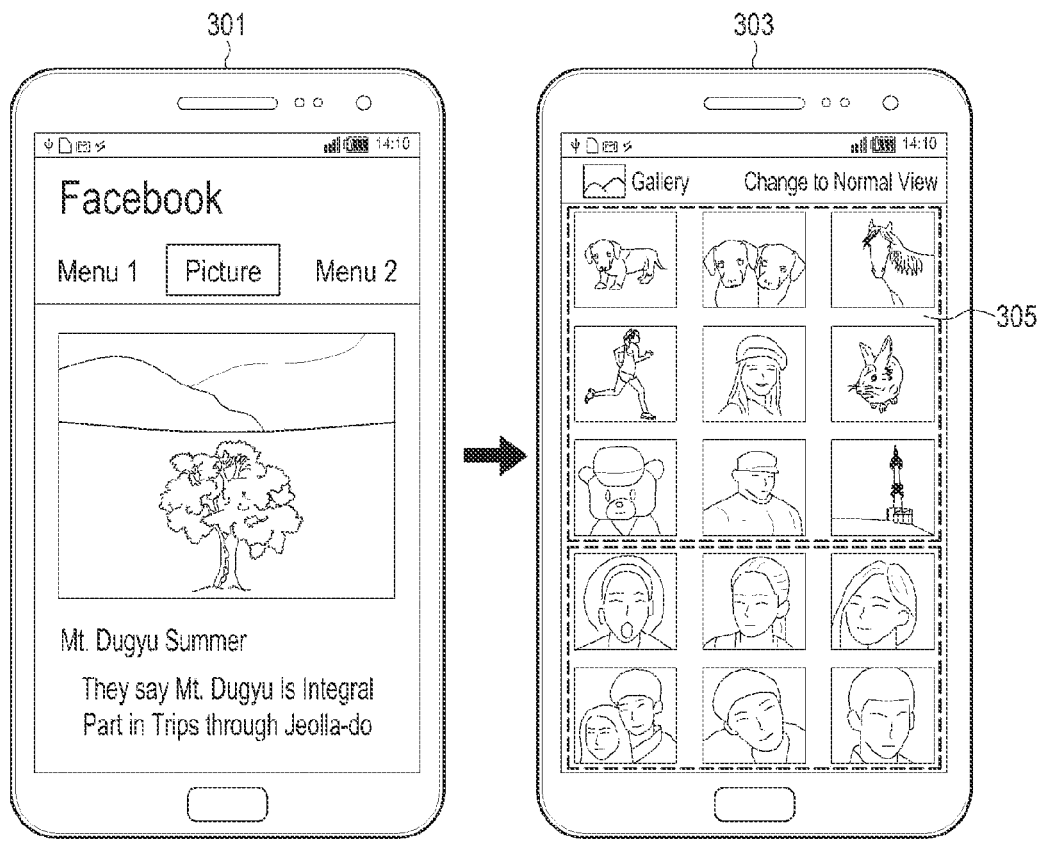
FIG. 3 illustrates screens on which images are displayed, according to a second embodiment of the present invention.

FIG. 3 illustrates screens on which images are displayed, according to a second embodiment of the present invention.

Referring to FIG. 3, a mobile terminal transmits/receives messages to/from at least another party through a messaging application such as Facebook, which is illustrated in screen 301. Herein, the messaging application enables a user to transmit/receive messages to/from the other party, and includes Kakao Talk, Facebook, Twitter, MyPeople, and E-mail.

If a request for displaying pictures is received from a user, the mobile terminal searches for a latest chat log, and analyzes the found chat log to extract at least one word. The chat log includes content of messages transmitted to the other party through the messaging application, and content of messages received from the other party through the message application. The mobile terminal analyzes metadata of one or more images stored therein to search for one or more images including the extracted word in the stored images.

Thereafter, the mobile terminal determines whether any one(s) of the found images is an image already shared with the other party, based on a share log. The share log includes the other party's ID, and a shared image ID list corresponding to the other party's ID and informing of images already shared with the other party's ID.

If the mobile terminal determines that there is at least one shared image, the mobile terminal preferentially displays at least one image except for the shared image among the found images. The mobile terminal may sequentially display the remaining images except for the displayed image among the stored images, and display the shared image for the last time.

If all the found images are images that have never been shared with the other party, as illustrated in screen 303, the mobile terminal preferentially displays the found images in the upper region 305 of screen 303, and sequentially displays the remaining images except for the found images among the stored images.

If a plurality of images has been found, the mobile terminal preferentially displays a latest image among the found images based on times at which the individual images have been taken. For example, if the word extracted from the chat log is "White", the mobile terminal may search for two images having metadata including the word "White" in the stored images, and display the two images in the order of later times at which the individual images have been taken, from the upper left area to the lower right area in the upper region 305, as illustrated in screen 303.

Figure 4:
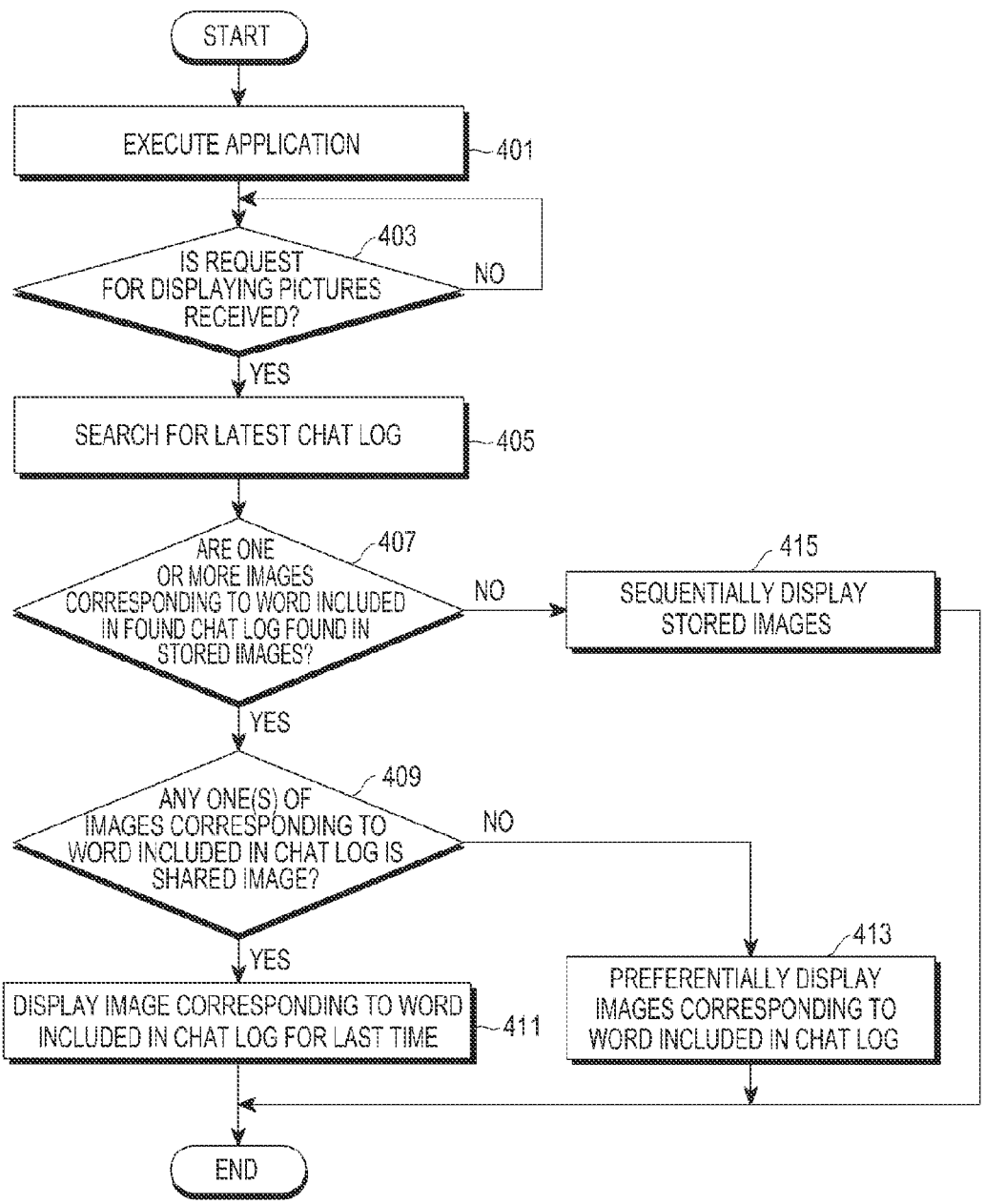
FIG. 4 is a flowchart of a method of displaying images in a mobile terminal, according to the second embodiment of the present invention.

FIG. 4 is a flowchart of a method of displaying images in a mobile terminal, according to the second embodiment of the present invention.

Referring to FIG. 4, in step 401, the mobile terminal executes a messaging application, contacts at least another party through the messaging application, and then proceeds to step 403. Herein, the messaging application enables a user to transmit/receive messages to/from the other party, and includes Kakao Talk, Facebook, Twitter, MyPeople, and E-mail. For example, if the messaging application is Facebook, the mobile terminal may provide a user with a function of uploading pictures in his/her Facebook, which is illustrated in screen 301 of FIG. 3.

In step 403, the mobile terminal determines whether a request for displaying pictures is received from the user. If transmission of an image is requested by the user while the messaging application is executed, if a picture management application is executed by the user while the messaging application is executed, or if uploading of an image is requested by the user while the messaging application is executed, the mobile terminal determines that a request for displaying pictures has been received from the user. The picture management application is (e.g., a gallery) for managing at least one pre-stored image.

If the mobile terminal determines that a request for displaying pictures has been received, the mobile terminal proceeds to step 405. Otherwise, the mobile terminal continues to perform step 403.

In step 405, the mobile terminal searches for a lately stored chat log among stored chat logs, and then, proceeds to step 407. The chat log includes content of messages transmitted to the other party through the messaging application, and content of messages received from the other party through the message application.

In step 407, the mobile terminal searches for one or more images stored in a memory unit, and determines whether the found images include one or more images corresponding to the found chat log. The mobile terminal determines whether metadata of at least one predetermined image includes at least one word included in the chat log, and determines that the stored images include one or more images corresponding to the found chat log if the metadata of the predetermined image includes the word included in the chat log. In contrast, if the metadata of the predetermined image does not include the word included in the chat log, the mobile terminal determines that the stored images include no image corresponding to the chat log.

If the mobile terminal determines that the stored images include one or more images corresponding to the chat log, the mobile terminal proceeds to step 409. Otherwise, the mobile terminal proceeds to step 415.

In step 415, the mobile terminal sequentially displays the images stored in the memory unit. In step 409, the mobile terminal determines whether any one(s) of the images corresponding to the chat log is an image already shared with the other party, based on a share log. The share log includes the other party's ID, and a shared image ID list corresponding to the other party's ID and informing of images already shared with the other party's ID.

If the mobile terminal determines that at least one of IDs of the images corresponding to the chat log is included in a shared image ID list corresponding to the other party's ID, the mobile terminal determines that the corresponding one of the images corresponding to the chat log is already shared with the other party. In contrast, if the mobile terminal determines that none of the IDs of the images corresponding to the chat log is included in the shared image ID list corresponding to the other party's ID, the mobile terminal determines that the images corresponding to the chat log have never been shared with the other party.

If the mobile terminal determines that there is at least one shared image, the mobile terminal proceeds to step 411. Otherwise, the mobile terminal proceeds to step 413.

In step 411, the mobile terminal preferentially displays the remaining images except for the shared image among the images corresponding to the chat log, sequentially displays the remaining images except for the images corresponding to the chat log among the stored images, and then displays the shared image for the last time.

In step 413, the mobile terminal preferentially displays the images corresponding to the chat log among the stored images, and sequentially displays the remaining images except for the images corresponding to the chat log.

If a plurality of images has been found, the mobile terminal preferentially displays a latest image among the found images based on times at which the individual images have been taken. For example, if the word extracted from the chat log is "White", the mobile terminal may search for two images having metadata including the word "White" in the stored images, and display the two images in the order of later times at which the individual images have been taken, from the upper left area to the lower right area in the upper region 305, as illustrated in screen 303.

Figure 5:
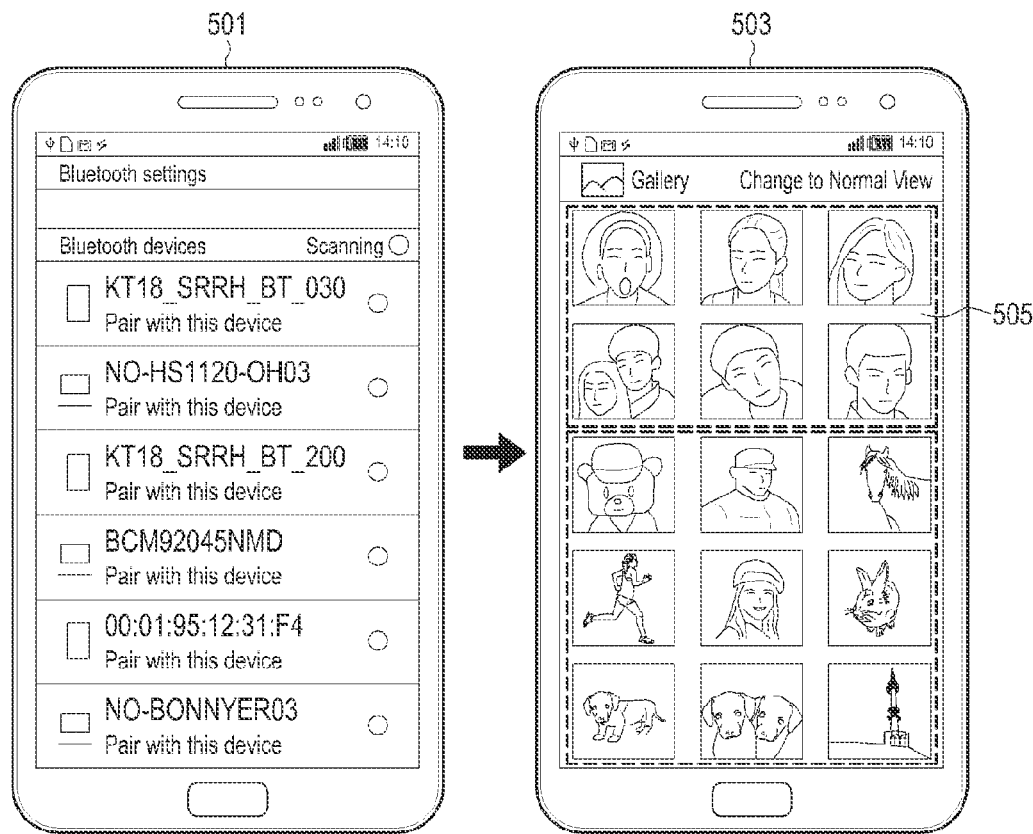
FIG. 5 illustrates screens on which images are displayed, according to a third embodiment of the present invention.

FIG. 5 illustrates screens on which images are displayed, according to a third embodiment of the present invention.

Referring to FIG. 5, the mobile terminal connects to the other party's mobile terminal using Near Field Communication (NFC) (e.g., Bluetooth or WiFi), as illustrated in screen 501. If a request for displaying pictures is received from a user, the mobile terminal searches for one or more images corresponding to the other party's ID of the other party's mobile terminal in one or more images stored in the mobile terminal.

The mobile terminal determines whether any one(s) of the found images is already shared with the other party, based on a share log. The share log includes the other party's ID, and a shared image ID list corresponding to the other party's ID and informing of images already shared with the other party's ID.

If the mobile terminal determines that there is at least one shared image, the mobile terminal preferentially displays one or more images except for the shared image among the found images. The mobile terminal sequentially displays the remaining images except for the displayed images among the stored images, and displays the shared image for the last time.

If the found images have never been shared with the other party, the mobile terminal preferentially displays the found images in the upper region 505 of screen 503, and sequentially displays the remaining images except for the found images among the stored images.

If a plurality of images has been found, the mobile terminal preferentially displays a latest image among the found images based on times at which the individual images have been taken. For example, as illustrated in screen 503, if six images have been found, the mobile terminal may display the six images in the order of later times at which the individual images have been taken, from the upper left area to the lower right area in the upper region 505.

Figure 6:
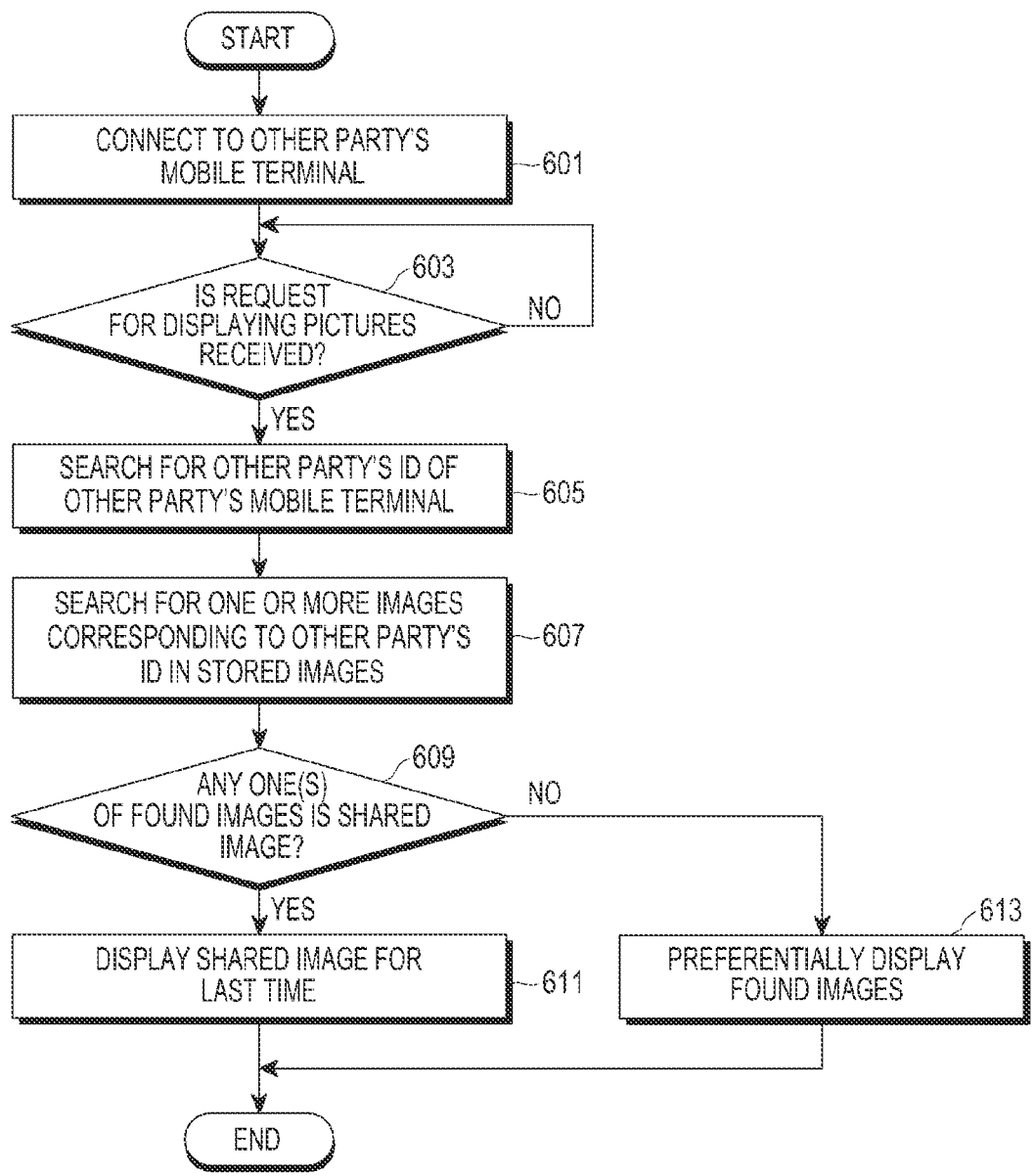
FIG. 6 is a flowchart of a method of displaying images in a mobile terminal, according to the third embodiment of the present invention.

FIG. 6 is a flowchart of a method of displaying images in a mobile terminal, according to the third embodiment of the present invention.

Referring to FIG. 6, in step 601, the mobile terminal connects to the other party's mobile terminal through NFC, and then proceeds to step 603. The NFC includes Bluetooth and WiFi.

In step 603, the mobile terminal determines whether a request for displaying pictures is received from a user. If transmission of an image is requested by the user, if a picture management application is executed by the user, or if uploading of an image is requested by the user, the mobile terminal determines that a request for displaying pictures has been received from the user. The picture management application is (e.g., a gallery) for managing at least one pre-stored image.

If the mobile terminal determines that a request for displaying pictures has been received, the mobile terminal proceeds to step 605. Otherwise, the mobile terminal continues to perform step 603.

In step 605, the mobile terminal searches for the other party's ID, and then proceeds to step 607. Herein, the other party's ID may be a Media Access Control (MAC) address of the other party's mobile terminal, or an Internet Protocol (IP) address allocated to the other party's mobile terminal. If the mobile terminal has connected to the other party's mobile terminal through Bluetooth, the other party's ID may be a Bluetooth address.

In step 607, the mobile terminal searches for one or more images corresponding to the other party's ID in one or more images stored in the mobile terminal, and then proceeds to step 609. The mobile terminal searches for the other party's name corresponding to the other party's ID in a phone book, and determines whether an image corresponding to the other party's name is found in the phone book. If an image corresponding to the other party's name is found, the mobile terminal extracts a face image from the found image using an image processing technique, and searches for one or more images including the extracted face image in the stored images. In contrast, if no image corresponding to the other party's name is found, the mobile terminal searches for one or more images having metadata including the other party's name in the stored images.

In step 609, the mobile terminal determines whether any one(s) of one or more images corresponding to a found chat log is already shared with the other party, based on a share log. The share log includes the other party's ID, and a shared image ID list corresponding to the other party's ID and informing of images already shared with the other party's ID.

If at least one of IDs of the images corresponding to the chat log is included in the shared image ID list corresponding to the other party's ID, the mobile terminal determines that the corresponding one of the images corresponding to the chat log is already shared with the other party. In contrast, if none of the IDs of the images corresponding to the chat log is included in the shared image ID list corresponding to the other party's ID, the mobile terminal determines that the images corresponding to the chat log have never been shared with the other party.

If the mobile terminal determines that there is at least one shared image, the mobile terminal proceeds to step 611. Otherwise, the mobile terminal proceeds to step 613.

In step 611, the mobile terminal displays the remaining images except for the shared image among the images corresponding to the chat log. The mobile terminal sequentially displays the remaining images except for the images corresponding to the chat log among the stored images, and displays the shared image for the last time.

In step 613, the mobile terminal preferentially displays the images corresponding to the chat log among the stored images, and sequentially displays the remaining images except for the images corresponding to the chat log.

If a plurality of images has been found, the mobile terminal preferentially displays a latest image among the found images based on times at which the individual images have been taken. For example, as illustrated in screen 503, if six images have been found, the mobile terminal may display the six images in the order of later times at which the individual images have been taken, from the upper left area to the lower right area in the upper region 505.

Figure 7:
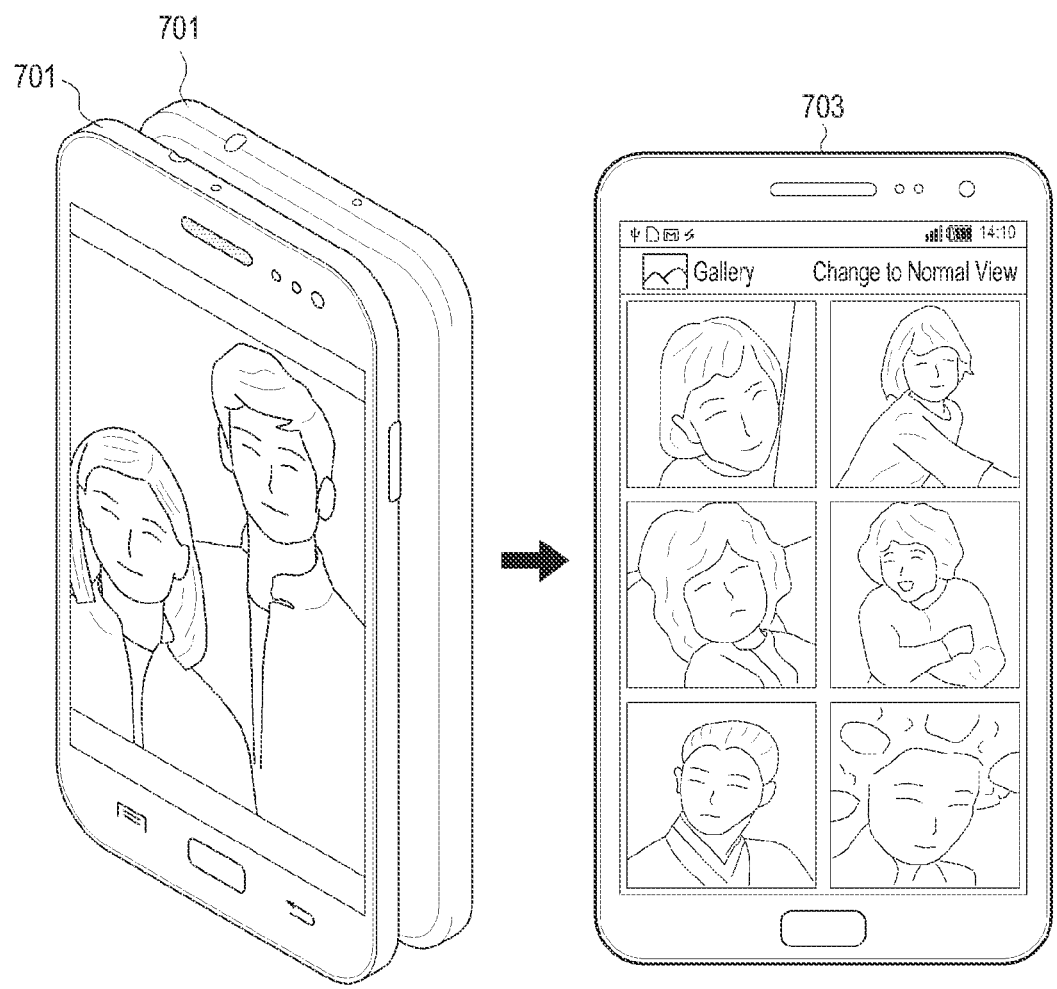
FIG. 7 illustrates screens on which images are displayed, according to a fourth embodiment of the present invention.

FIG. 7 illustrates screens on which images are displayed, according to a fourth embodiment of the present invention.

Referring to FIG. 7, a mobile terminal connects to the other party's mobile terminal using NFC, which is illustrated in screen 701. If a request for displaying pictures is received from a user, the mobile terminal searches for one or more images corresponding to a phone number allocated to the other party's mobile terminal in one or more images included in a phone book.

If one or more images corresponding to the phone number of the other party are found, the mobile terminal extracts one or more face images from the images corresponding to the phone number using an image processing technique. The image processing technique involves extracting a face image based on changes in color of pixels included in an image. The mobile terminal searches for one or more images stored in a memory unit of the mobile terminal, and searches for one or more images including at least one of the extracted face images in the images stored in the memory unit.

As illustrated in screen 703, the mobile terminal preferentially displays the found images on screen 703, and sequentially displays the remaining images except for the images including at least one of the extracted face images among the stored images.

If no image corresponding to the phone number is found, the mobile terminal searches for the other party's name corresponding to the phone number or the other party's E-mail address, and searches for one or more images having metadata including the other party's name in the stored images.

As illustrated in screen 703, the mobile terminal preferentially displays the found images on screen 703, and sequentially displays the remaining images except for the images including at least one of the extracted face images among the stored images.

If a plurality of images has been found, the mobile terminal preferentially displays a latest image among the found images based on times at which the individual images have been taken. For example, as illustrated in screen 703, if six images have been found, the mobile terminal may display the six images in the order of later times at which the individual images have been taken, from the upper left area to the lower right area on screen 703.

Figure 8:
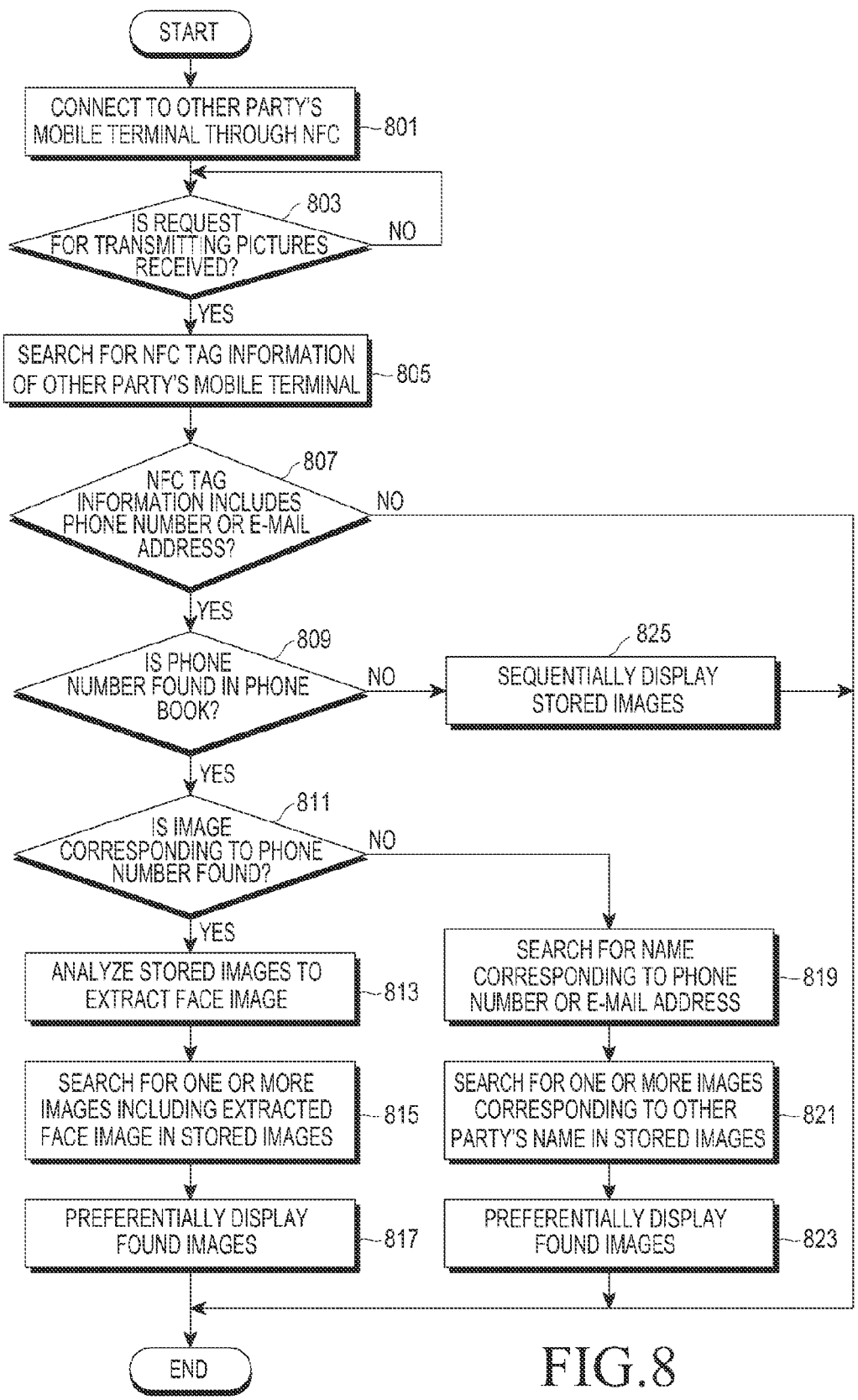
FIG. 8 is a flowchart of a method of displaying images in a mobile terminal, according to the fourth embodiment of the present invention.

FIG. 8 is a flowchart of a method of displaying images in a mobile terminal, according to the fourth embodiment of the present invention.

Referring to FIG. 8, in step 801, the mobile terminal connects to the other party's mobile terminal through NFC, receives NFC tag information from the other party's mobile terminal, and then proceeds to step 803. In step 803, the mobile terminal determines whether a request for transmitting pictures to the other party's mobile terminal is received from a user. If transmission of an image is requested by the user, if a picture management application is executed by the user, or if uploading of an image is requested by the user, the mobile terminal determines that a request for transmitting pictures has been received from the user. The picture management application is (e.g., a gallery) for managing at least one pre-stored image.

If the mobile terminal determines that a request for transmitting pictures has been received, the mobile terminal proceeds to step 805. Otherwise, the mobile terminal continues to perform step 803.

In step 805, the mobile terminal searches for the received NFC tag information, and in step 807, the mobile terminal analyzes the found NFC tag information to determine whether the NFC tag information includes a phone number of the other party's mobile terminal or the other party's E-mail address. If the mobile terminal determines that the NFC tag information includes a phone number of the other party's mobile terminal or the other party's E-mail address, the mobile terminal proceeds to step 809. Otherwise, the mobile terminal proceeds to step 803.

In step 809, the mobile terminal determines whether the phone number of the other party's mobile terminal is found in a phone book. The phone book may include the other party's name, the other party's phone number corresponding to the other party's name, the other party's ID corresponding to the other party's name and used in a messaging application, and an image corresponding to the other party's name. If the mobile terminal determines that the phone number of the other party's mobile terminal is found in the phone book, the mobile terminal proceeds to step 811. Otherwise, the mobile terminal proceeds to step 825.

In step 825, the mobile terminal sequentially displays one or more images stored in a memory unit of the mobile terminal.

In step 811, the mobile terminal determines whether an image corresponding to the phone number of the other party's mobile terminal is found in the phone book. If an image corresponding to the phone number of the other party's mobile terminal is found in the phone book, the mobile terminal proceeds to step 813. Otherwise, the mobile terminal proceeds to step 819.

In step 813, the mobile terminal detects an image corresponding to the phone number of the other party's mobile terminal, extracts a face image from the detected image using an image processing technique, and then proceeds to step 815. The image processing technique involves extracting a face image based on changes in color of pixels included in an image. In step 815, the mobile terminal compares the extracted face image to one or more images stored in the mobile terminal to search for one or more images including the extracted face image in the stored images, and then proceeds to step 817.

In step 817, the mobile terminal preferentially displays the found images (that is, images corresponding to the other party's face image) among the stored images, and sequentially displays the remaining images except for the found images among the stored images.

If a plurality of images has been found, the mobile terminal preferentially displays a latest image among the found images based on times at which the individual images have been taken. For example, as illustrated in screen 703 of FIG. 7, if six images have been found, the mobile terminal may display the six images in the order of later times at which the individual images have been taken, from the upper left area to the lower right area on screen 703.

In step 819, the mobile terminal searches for the other party's name corresponding to the phone number of the other party's mobile terminal or the other party's E-mail address in the phone book, and then, proceeds to step 821. In step 821, the mobile terminal searches for one or more images corresponding to the other party's name in the stored images, and then, proceeds to step 823. The mobile terminal analyzes metadata of the stored images to determine whether metadata of each image includes the other party's name, and determines that the corresponding image is an image corresponding to the other party's name if the analyzed metadata of the image includes the other party's name.

In step 823, the mobile terminal preferentially displays the found images (that is, images corresponding to the other party's name) among the stored images, and sequentially displays the remaining images except for the found images among the stored images.

If a plurality of images has been found, the mobile terminal preferentially displays a latest image among the found images based on times at which the individual images have been taken. For example, as illustrated in screen 703, if six images have been found, the mobile terminal may display the six images in the order of later times at which the individual images have been taken, from the upper left area to the lower right area in screen 703.

Figure 9:
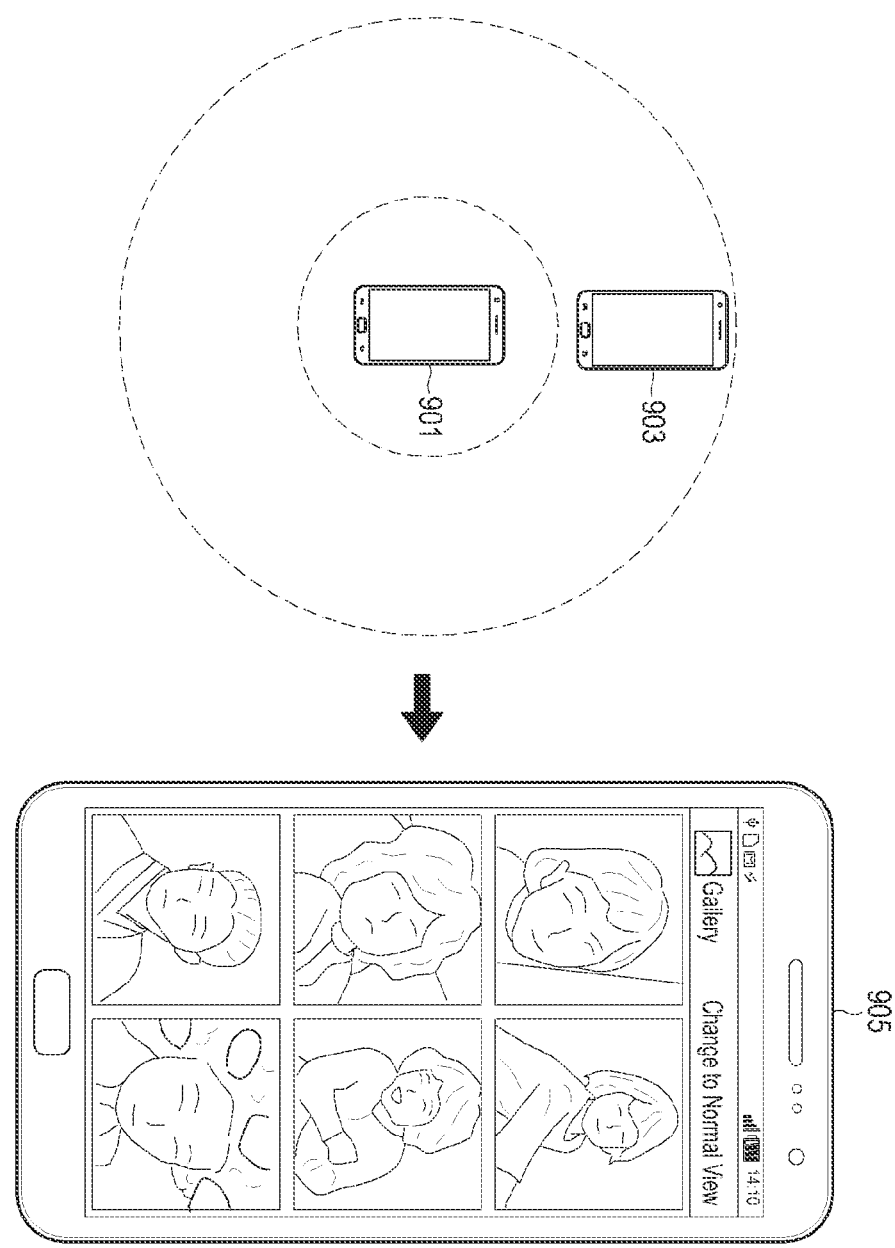
FIG. 9 illustrates screens on which images are displayed, according to a fifth embodiment of the present invention.

FIG. 9 illustrates screens on which images are displayed, according to a fifth embodiment of the present invention.

Referring to FIG. 9, as illustrated in screen 901, a mobile terminal estimates a location of the other party's mobile terminal using at least one of Global Positioning System (GPS) and Indoor Position System (IPS). Herein, the GPS is for estimating a location of the other party's mobile terminal using a satellite, and the IPS is for estimating a location of the other party's mobile terminal located within a short distance from a mobile terminal, such as by using Bluetooth, WiFi, or a Long Term Evolution (LTE) network.

If a distance between the mobile terminal and the other party's mobile terminal is equal to or shorter than a predetermined distance, the mobile terminal determines whether an image corresponding to the other party's name is found in one or more images stored in a phone book.

If an image corresponding to the other party's name is found in the images stored in the phone book, the mobile terminal extracts a face image from the image corresponding to the other party's name using an image processing technique. The image processing technique is for extracting a face image based on changes in color of pixels included in an image. The mobile terminal searches for one or more images including the extracted face image in one or more images stored in a memory unit of the mobile terminal.

As illustrated in screen 905, the mobile terminal preferentially displays the found images on screen 905, and sequentially displays the remaining images except for the images including the extracted face image among the stored images.

If no image corresponding to the other party's name is found, the mobile terminal searches for one or more images having metadata including the other party's name in the stored images.

As illustrated in screen 905, the mobile terminal preferentially displays the found images on screen 905, and sequentially displays the remaining images except for one or more images including the extracted face image among the stored images.

If a plurality of images has been found, the mobile terminal preferentially displays a latest image among the found images based on times at which the individual images have been taken. For example, as illustrated in screen 905, if six images have been found, the mobile terminal may display the six images in the order of (that is, order beginning with) later times at which the individual images have been taken, from the upper left area to the lower right area in screen 905.

Figure 10:
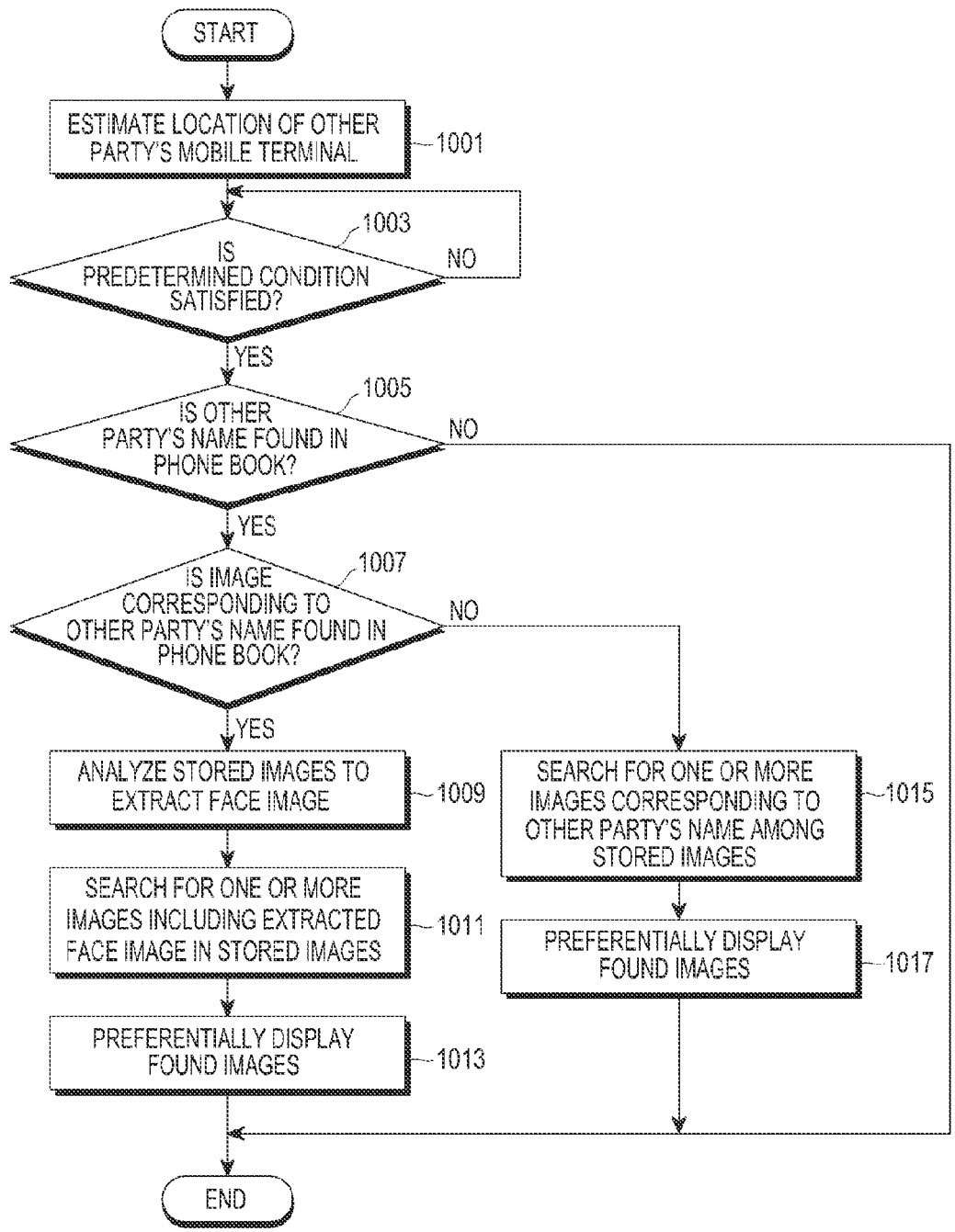
FIG. 10 is a flowchart of a method of displaying images in a mobile terminal, according to the fifth embodiment of the present invention.

FIG. 10 is a flowchart of a method of displaying images in a mobile terminal, according to the fifth embodiment of the present invention.

Referring to FIG. 10, in step 1001, the mobile terminal estimates a location of the other party's mobile terminal using one of GPS and IPS, and then proceeds to step 1003. Herein, the GPS is for estimating a location of the other party's mobile terminal using a satellite, and the IPS is for estimating a location of the other party's mobile terminal located in a short distance from the mobile terminal using such technology as Bluetooth, WiFi, or a Long Term Evolution (LTE) network. A technique of estimating a location of the other party's mobile terminal using one of GPS and IPS is well-known in the art. Accordingly, further descriptions will be omitted.

In step 1003, the mobile terminal determines whether a predetermined condition is satisfied. The predetermined condition includes at least one of a distance between the mobile terminal and the other party's mobile terminal being equal to or shorter than a predetermined reference distance, and a difference between a current time and a schedule time including the other party's name corresponding to the other party's mobile terminal being equal to or less than a predetermined reference value.

If the mobile terminal determines that the predetermined condition is satisfied, the mobile terminal proceeds to step 1005. Otherwise, the mobile terminal continues to perform step 1003.

In step 1005, the mobile terminal determines whether the other party's name corresponding to an ID of the other party's mobile terminal is found in a phone book. The ID of the other party's mobile terminal is a unique number allocated to the other party's mobile terminal in order to identify the other party's mobile terminal. For example, the ID of the other party's mobile terminal may be a phone number of the other party's mobile terminal. The phone book may include the other party's name, the other party's phone number corresponding to the other party's name, the other party's ID corresponding to the other party's name and used in a messaging application, and an image corresponding to the other party's name.

If the mobile terminal determines whether the other party's name corresponding to the ID of the other party's mobile terminal is found in the phone book, the mobile terminal proceeds to step 1007. Otherwise, the mobile terminal terminates operation of displaying images.

In step 1007, the mobile terminal determines whether an image corresponding to the other party's name is found in the phone book. If an image corresponding to the other party's name is found in the phone book, the mobile terminal proceeds to step 1009. Otherwise, the mobile terminal proceeds to step 1015.

In step 1009, the mobile terminal detects the image corresponding to the other party's name, extracts a face image from the detected image using an image processing technique, and then proceeds to step 1011. The image processing technique is for extracting a face image based on changes in color of pixels included in an image. In step 1011, the mobile terminal compares the extracted face image to one or more images stored in a memory unit to search for one or more images including the extracted face image in the stored images, and then proceeds to step 1013.

In step 1013, the mobile terminal preferentially displays the found images (that is, images corresponding to the other party's face image) among the stored images, and sequentially displays the remaining images except for the found images among the stored images.

In step 1015, the mobile terminal searches for one or more images corresponding to the other party's name among the stored images, and then proceeds to step 1017. The mobile terminal analyzes metadata of the stored images to determine whether metadata of each image includes the other party's name, and determines that the corresponding image corresponds to the other party's name if the analyzed metadata of the image includes the other party's name.

In step 1017, the mobile terminal preferentially displays the found images (that is, images corresponding to the other party's name) among the stored images, and sequentially displays the remaining images except for the found images among the stored images.

If a plurality of images has been found, the mobile terminal preferentially displays a latest image among the found images in consideration of times at which the individual images have been taken. For example, as illustrated in screen 905, if six images have been found, the mobile terminal may display the six images in the order of later times at which the individual images have been taken, from the upper left area to the lower right area in screen 905.

Figure 11:
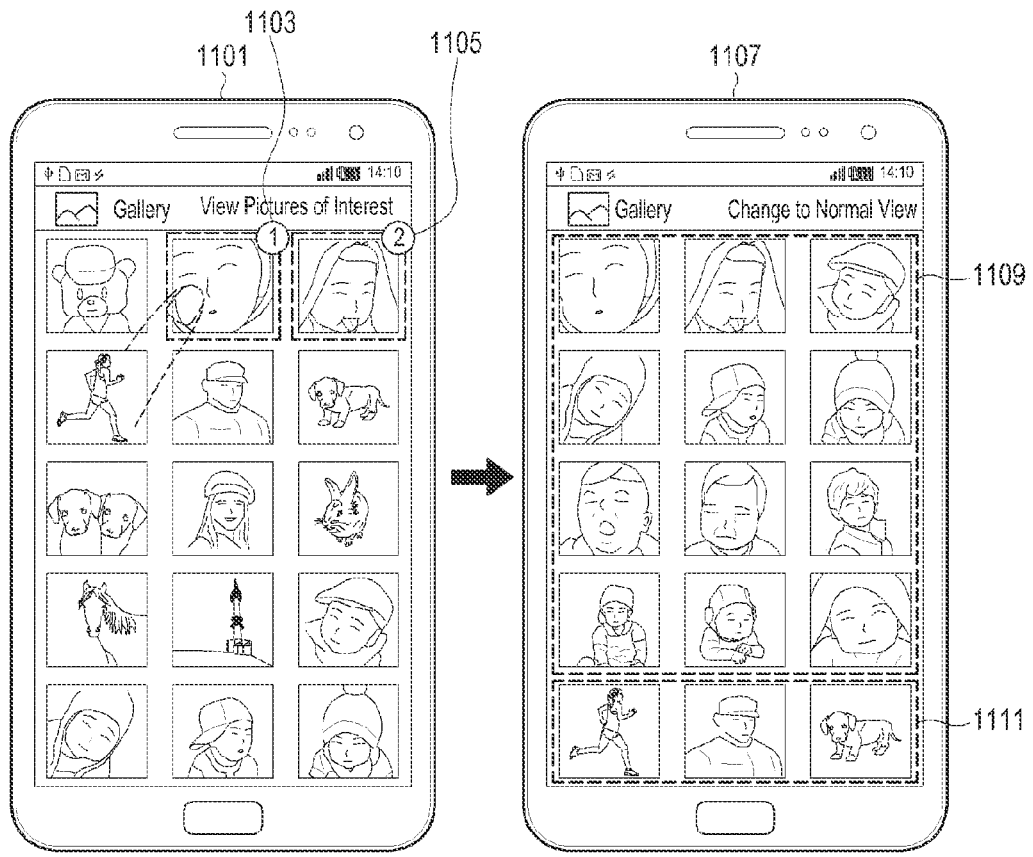
FIG. 11 illustrates screens on which images are displayed, according to a sixth embodiment of the present invention.

FIG. 11 illustrates screens on which images are displayed, according to a sixth embodiment of the present invention.

Referring to FIG. 11, as illustrated in screen 1101, if a request for executing a gallery that is a picture management application is received from a user, a mobile terminal sequentially displays a plurality of images stored in a memory unit. If first and second images 1103 and 1105 of the images are successively selected by the user, the mobile terminal determines whether the first and second images 1103 and 1105 include the same face image.

If the mobile terminal determines that the first and second images 1103 and 1105 include the same face image, the mobile terminal searches for one or more images including the same face image in the images stored in the memory unit. As illustrated in screen 1107, the mobile terminal preferentially displays the found images, and sequentially displays the remaining images except for the found images among the stored images. For example, as illustrated in screen 1107, if twelve images have been found, the mobile terminal may display the twelve images in a region 1109, and sequentially display the remaining images in a region 1111.

The mobile terminal determines whether any one(s) of the found images is already shared with the other party, based on a share log. If the mobile terminal determines that there is at least one shared image, the mobile terminal preferentially displays at least one image except for the shared image among the found images. The mobile terminal sequentially displays the remaining images except for the displayed image among the stored images. The mobile terminal may display the shared image for the last time.

If a plurality of images has been found, the mobile terminal preferentially displays a latest image among the found images based on times at which the individual images have been taken. For example, as illustrated in screen 1107, if twelve images have been found, the mobile terminal may display the twelve images in the order of later times at which the individual images have been taken, from the upper left area to the lower right area in the region 1109.

Figure 12:
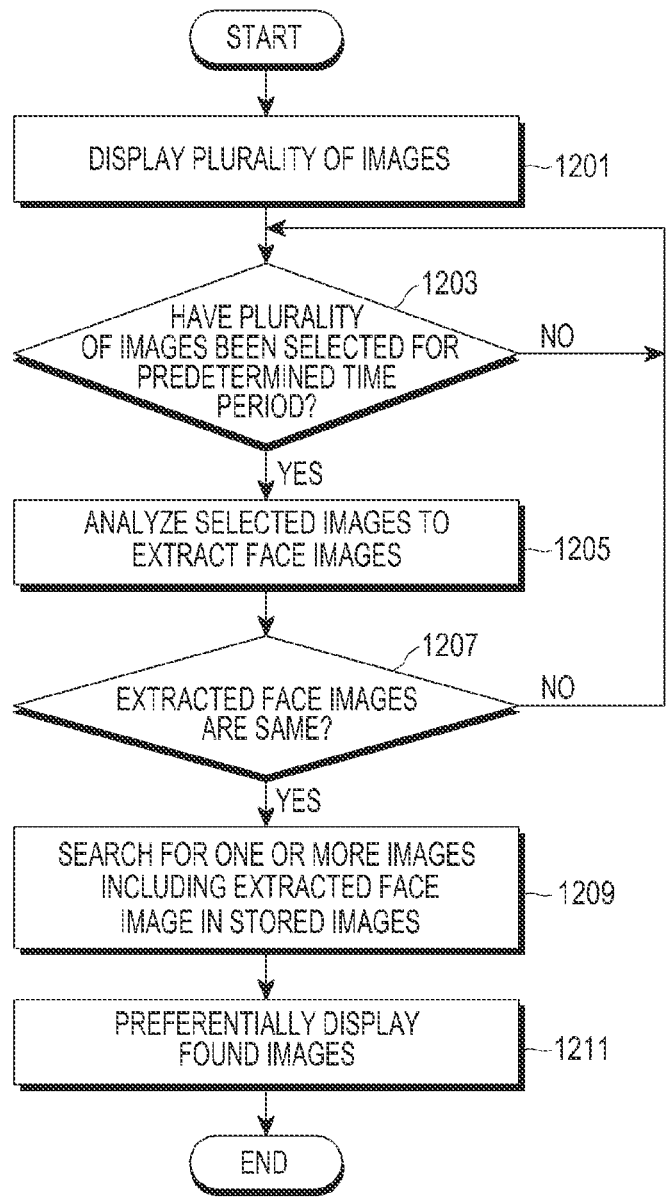
FIG. 12 is a flowchart of a method of displaying images in a mobile terminal, according to the sixth embodiment of the present invention.

FIG. 12 is a flowchart of a method of displaying images in a mobile terminal, according to the sixth embodiment of the present invention.

Referring to FIG. 12, in step 1201, if a request for executing a gallery that is a picture management application is received from a user, the mobile terminal sequentially displays a plurality of images stored in a memory unit of the mobile terminal, and then proceeds to step 1203. In step 1203, the mobile terminal determines whether at least two images of the plurality of displayed images have been selected by the user for a predetermined time period. When one of the displayed images is touched by the user's finger or a stylus pen, the mobile terminal may determine that the corresponding image has been selected.

If the mobile terminal determines that at least two images have been selected, the mobile terminal proceeds to step 1205. Otherwise, the mobile terminal continues to perform step 1203.

In step 1205, the mobile terminal analyzes the two images using an image processing technique to extract face images from the two images, and then proceeds to step 1207. The image processing technique is for extracting a face image based on changes in color of pixels included in an image.

In step 1207, the mobile terminal compares the extracted face images to each other to determine whether the extracted face images are the same. If the mobile terminal determines that the extracted face images are the same, the mobile terminal proceeds to step 1209. Otherwise, the mobile terminal proceeds to step 1203. In step 1209, the mobile terminal searches for one or more images including the face image in a plurality of images stored in a memory unit, and then proceeds to step 1211.

In step 1211, the mobile terminal preferentially displays the found images, and sequentially displays the remaining images except for the found images among the stored images. For example, as illustrated in screen 1107 of FIG. 11, if twelve images are found, the mobile terminal may preferentially display the twelve images in the region 1109, and sequentially display the remaining images in the region 1111.

The mobile terminal determines whether any one(s) of the found images is an image already shared with the other party, based on a share log. If the mobile terminal determines that there is at least one shared image, the mobile terminal preferentially displays at least one image except for the shared image among the found images. The mobile terminal sequentially displays the remaining images except for the displayed images among the stored images. The mobile terminal may display the shared image for the last time.

If a plurality of images has been found, the mobile terminal preferentially displays a latest image among the found images based on times at which the individual images have been taken. For example, as illustrated in screen 1107, if twelve images have been found, the mobile terminal may display the twelve images in the order of later times at which the individual images have been taken, from the upper left area to the lower right area in the region 1109.

Figure 13:
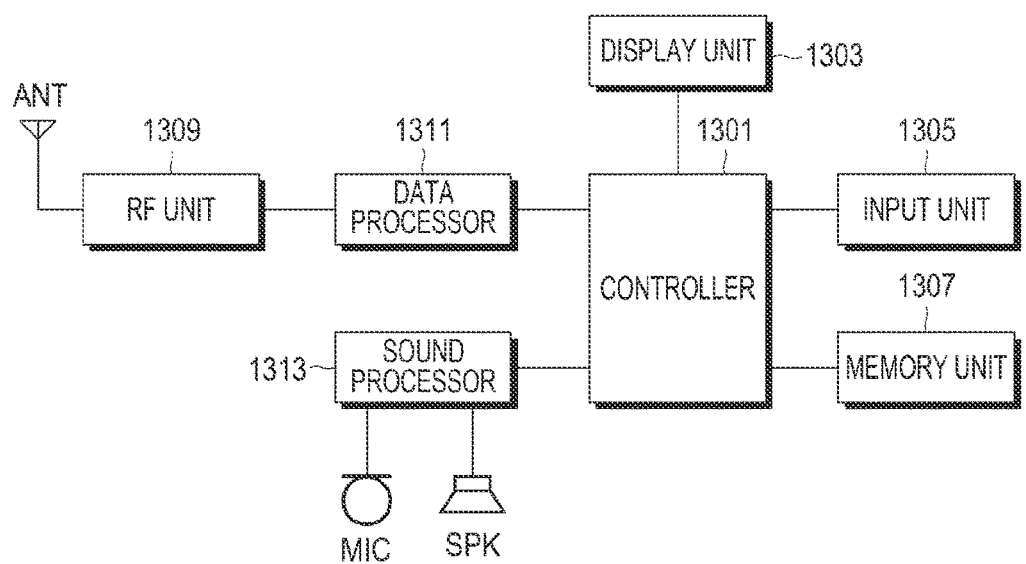
FIG. 13 is a block diagram of a mobile terminal, according to an embodiment of the present invention.

FIG. 13 is a block diagram of a mobile terminal, according to an embodiment of the present invention.

Referring to FIG. 13, the mobile terminal includes a controller 1301, a display unit 1303, an input unit 1305, a memory unit 1307, a Radio Frequency (RF) unit 1309, a data processor 1311, and a sound processor 1313.

The RF unit 1309 performs a radio communication function of the mobile terminal. The RF unit 1309 includes a radio transmitter (not shown) to up-convert the frequency of a signal to be transmitted and amplify the resultant signal, and a radio receiver (not shown) to low-noise amplify a received signal and down-convert the frequency of the received signal. The data processor 1311 includes a transmitter (not shown) to encode and modulate a signal to be transmitted, and a receiver (not shown) to demodulate and decode a received signal. The data processor 1311 may include a modulator-demodulator (MODEM) and a coder-decoder (CODEC) (not shown), and the CODEC may include a data codec to process packet data, and an audio codec to process an audio signal such as voice.

The sound processor 1313 performs a function of reproducing a received audio signal output from the data processor 1311 through a speaker, or of transmitting an audio signal to be transmitted, generated by a microphone, to the data processor 1311. The input unit 1305 includes keys for allowing a user to input figures or text information, and function keys for allowing the user to set various functions. The display unit 1303 displays image signals on-screen, and displays data requested to be output by the controller 1301. If the display unit 1303 is implemented as a capacitive-type or resistive-type touch screen, the input unit 1305 may include a minimum number of predetermined keys, and the display unit 1303 may provide a part of the key input functions of the input unit 405.

The memory unit 1307 includes a program memory (not shown) and a data memory (not shown). The program memory stores booting and Operating System (hereinafter OS) for controlling the general operations of the mobile terminal, and the data memory stores various types of data created when the mobile terminal operates. The memory unit 1307 stores at least one image, a phone book, the other party's mobile terminal ID corresponding to the other party's name, and a share log.

Herein, the phone book may include the other party's name, the other party's phone number corresponding to the other party's name, the other party's ID corresponding to the other party's name and used in the messaging application, and an image corresponding to the other party's name. The other party's ID of the other party's mobile terminal may be a MAC address of the other party's mobile terminal, or an IP address allocated to the other party's mobile terminal. If the mobile terminal has connected to the other party's mobile terminal through Bluetooth, the other party's ID may be a Bluetooth address.

The share log includes the other party's ID, and a shared image ID list corresponding to the other party's ID and informing of images already shared with the other party's ID. The chat log includes content of messages transmitted to the other party through the messaging application, and content of messages received from the other party through the message application. Any one of the at least one image may or may not include a specific word in metadata.

The mobile terminal may include a NFC communication unit (not shown) and a proximity communication unit (not shown). The NFC communication unit performs NFC with the other party's mobile terminal under the control of the controller 1301. For example, the NFC communication may be WiFi or Bluetooth. The proximity communication unit performs NFC with the other party's mobile terminal under the control of the controller 1301.

The controller 1301 controls overall functions of the mobile terminal. Specifically, the controller 1301 displays at least one image stored in the memory unit 1307 according to various embodiments.

According to the first embodiment, the controller 1301 executes a messaging application, and contacts at least another party through the executed messaging application. Herein, the messaging application enables a user to transmit/receive messages to/from the other party, and includes Kakao Talk, Facebook, Twitter, MyPeople, and E-mail. For example, if the messaging application is Kakao Talk, the mobile terminal may provide a user with a group chatting function by which the user can chat with two or more other parties, as illustrated in screen 101 of FIG. 1.

The controller 1301 determines whether a request for displaying pictures is received from the user. If transmission of an image is requested by the user while the messaging application is executed, if a picture management application is executed by the user while the messaging application is executed, or if uploading of an image is requested by the user while the messaging application is executed, the controller 1301 determines that a request for displaying pictures has been received from the user. The picture management application is (e.g., a gallery) for managing at least one pre-stored image.

If the controller 1301 determines that a request for displaying pictures has been received, the controller 1301 searches for the other party's ID, and determines whether the other party's ID is found in a phone book. The phone book may include the other party's name, the other party's phone number corresponding to the other party's name, the other party's ID corresponding to the other party's name and used in the messaging application, and an image corresponding to the other party's name.

If the other party's ID is not found in the phone book, the controller 1301 sequentially displays the images stored in the memory unit 1307. In contrast, if the other party's ID is found in the phone book, the controller 1301 determines whether an image corresponding to the other party's ID is included in the phone book.

If the controller 1301 determines that an image corresponding to the other party's ID is found in the phone book, the controller 1301 detects the image corresponding to the other party's ID, and extracts a face image from the detected image using an image processing technique. The image processing technique is for extracting a face image based on changes in color of pixels included in an image.

The controller 1301 compares the extracted face image to the stored images to search for one or more images including the extracted face image in the stored images. The controller 1301 preferentially displays the found images (that is, images corresponding to the other party's face image) among the stored images, and sequentially displays the remaining images except for the found images among the stored images.

The controller 1301 determines whether any one(s) of the found images is already shared with the other party, based on a share log. The share log includes the other party's ID, and a shared image ID list corresponding to the other party's ID and informing of images already shared with the other party's ID. If the controller 1301 determines that there is at least one shared image, the controller 1301 preferentially displays at least one image except for the shared image among the found images. The controller 1301 sequentially displays the remaining images except for the displayed image among the stored images, and displays the shared image for the last time.

If the other party's ID is not found in the phone book, the controller 1301 searches for the other party's name corresponding to the other party's ID in the phone book, and searches for one or more images corresponding to the other party's name in the stored images. The controller 1301 may analyze metadata of the stored images to determine whether the analyzed metadata of each image includes the other party's name, and determine that the corresponding image corresponds to the other party's name if the analyzed metadata of the image includes the other party's name.

The controller 1301 preferentially displays the found images (that is, images corresponding to the other party's name) among the stored images, and sequentially displays the remaining images except for the found images among the stored images.

The controller 1301 determines whether any one(s) of the found images is an image already shared with the other party, based on a share log. If the controller 1301 determines that there is at least one shared image, the controller 1301 preferentially displays at least one image except for the shared image among the found images. The controller 1301 may sequentially display the remaining images except for the displayed image among the stored images, and display the shared image for the last time.

If a plurality of images has been found, the controller 1301 preferentially displays a latest image among the found images based on times at which the individual images have been taken. For example, as illustrated in screen 103, if six images have been found, the controller 1301 may display the six images in the order of later times at which the individual images have been taken, from the upper left area to the lower right area in the upper region 105.

According to the second embodiment, the controller 1301 executes a messaging application, and contacts at least another party through the executed messaging application. For example, if the messaging application is Facebook, the controller 1301 may provide a user with a function of uploading pictures in his/her Facebook, which is illustrated in screen 301 of FIG. 3.

The controller 1301 determines whether a request for displaying pictures is received from a user. If transmission of an image is requested by the user while the messaging application is executed, if a picture management application is executed by the user while the messaging application is executed, or if uploading of an image is requested by the user while the messaging application is executed, the controller 1301 determines that a request for displaying pictures has been received from the user.

If the controller 1301 determines that a request for displaying pictures has been received, the controller 1301 searches for a lately stored chat log among stored chat logs. The chat log includes content of messages transmitted to the other party through the messaging application, and content of messages received from the other party through the message application.

The controller 1301 searches for one or more images stored in the memory unit 1307, and searches for one or more images corresponding to the found chat log in the images stored in the memory unit 1307. The controller 1301 determines whether metadata of at least one predetermined image includes at least one word included in the chat log, and determines that the stored images include one or more images corresponding to the chat log if the metadata of the predetermined image includes the word included in the chat log. If the metadata of the predetermined image does not include the word included in the chat log, the controller 1301 determines that the stored images include no image corresponding to the chat log.

If the controller 1301 determines that the stored images do not include an image corresponding to the chat log, the controller 1301 sequentially displays the images stored in the memory unit 1307.

If the controller 1301 determines that the stored images include one or more images corresponding to the chat log, the controller 1301 determines whether any one(s) of the images corresponding to the chat log is an image already shared with the other party, based on a share log. Herein, the share log includes the other party's ID, and a shared image ID list corresponding to the other party's ID and informing of images already shared with the other party's ID.

If the controller 1301 determines that at least one of IDs of the images corresponding to the chat log is included in the shared image ID list corresponding to the other party's ID, the controller 1301 determines that the corresponding one of the images corresponding to the chat log is already shared with the other party. If the controller 1301 determines that none of the IDs of the images corresponding to the chat log is included in the shared image ID list, the controller 1301 determines that the images corresponding to the chat log have never been shared with the other party.

If the controller 1301 determines that there is at least one shared image, the controller 1301 preferentially displays the remaining images except for the shared image among the images corresponding to the chat log. The controller 1301 sequentially displays the remaining images except for the images corresponding to the chat log among the stored images, and displays the shared image for the last time.

If the controller 1301 determines that the images corresponding to the chat log have never been shared with the other party, the controller 1301 preferentially displays the images corresponding to the chat log among the stored images, and sequentially displays the remaining images except for the images corresponding to the chat log.

If a plurality of images has been found, the controller 1301 preferentially displays a latest image among the found images based on times at which the individual images have been taken. For example, if the word extracted from the chat log is "White", the controller 1301 may search for two images having metadata including the word "White" in the stored images, and display the two images in the order of later times at which the individual images have been taken, from the upper left area to the lower right area in the upper region 305, as illustrated in screen 303 of FIG. 3.

According to the third embodiment, the controller 1301 connects to the other party's mobile terminal using NFC, such as Bluetooth or WiFi.

The controller 1301 determines whether a request for displaying pictures is received from a user. If transmission of an image is requested by the user, if a picture management application is executed by the user, or if uploading of an image is requested by the user, the controller 1301 determines that a request for displaying pictures has been received from the user.

If the controller 1301 determines that a request for displaying pictures has been received from the user, the controller 1301 searches for the other party's ID of the other party's mobile terminal. Herein, the other party's ID may be a MAC address of the other party's controller 1301, or an IP address allocated to the other party's controller 1301. If the controller 1301 has connected to the other party's mobile terminal through Bluetooth, the other party's ID may be a Bluetooth address.

The controller 1301 searches for one or more images corresponding to the other party's ID in images stored in the memory unit 1307. The controller 1301 searches for the other party's name corresponding to the other party's ID in a phone book, and searches for an image corresponding to the found other party's name in the phone book. If an image corresponding to the other party's name is found in the phone book, the controller 1301 extracts a face image from the found image using an image processing technique, and searches for one or more images including the extracted face image in the stored images. If no image corresponding to the other party's name is found in the phone book, the controller 1301 searches for one or more images having metadata including the other party's name in the stored images.

The controller 1301 determines whether any one(s) of one or more images corresponding to a chat log is already shared with the other party, based on a share log. The share log includes the other party's ID, and a shared image ID list corresponding to the other party's ID and informing of images already shared with the other party's ID.

If the controller 1301 determines that at least one of IDs of the images corresponding to the chat log is included in the shared image ID list corresponding to the other party's ID, the controller 1301 determines that the corresponding one of the images corresponding to the chat log is already shared with the other party. In contrast, if the controller 1301 determines that none of the IDs of the images corresponding to the chat log is included in the shared image ID list corresponding to the other party's ID, the controller determines that the images corresponding to the chat log have never been shared with the other party.

If the controller 1301 determines that there is at least one shared image, the controller 1301 displays the remaining images except for the shared image among the images corresponding to the chat log. The mobile terminal sequentially displays the remaining images except for the images corresponding to the chat log among the stored images, and displays the shared image for the last time.

If the controller 1301 determines that the images corresponding to the chat log have never been shared with the other party, the controller 1301 preferentially displays one or more images corresponding to the chat log among the stored image, and sequentially displays the remaining images except for the images corresponding to the chat log.

If a plurality of images has been found, the controller 1301 preferentially displays a latest image among the found images based on times at which the individual images have been taken. For example, as illustrated in screen 503 of FIG. 5, if six images have been found, the mobile terminal may display the six images in the order of later times at which the individual images have been taken, from the upper left area to the lower right area in the upper region 505.

According to the fourth embodiment, the controller 1301 connects to the other party's mobile terminal through NFC, and receives and stores NFC tag information from the other party's mobile terminal. The controller 1301 determines whether a request for transmitting pictures to the other party's mobile terminal is received from a user. If transmission of an image is requested by the user, if a picture management application is executed by the user, or if uploading of an image is requested by the user, the controller 1301 determines that a request for transmitting pictures has been received from the user.

If the controller 1301 determines that a request for transmitting pictures has been received, the controller 1301 analyzes the found NFC tag information to determine whether the NFC tag information includes a phone number of the other party's mobile terminal or the other party's E-mail address.

If the controller 1301 determines that the NFC tag information includes neither the phone number of the other party's mobile terminal nor the other party's E-mail address, the controller 1301 sequentially displays one or more images stored in the memory unit 1307.

If the controller 1301 determines that the NFC tag information includes either the phone number of the other party's mobile terminal or the other party's E-mail address, the controller 1301 searches for the phone number of the other party's mobile terminal in a phone book.

If the phone number of the other party's mobile terminal is found in the phone book, the controller 1301 searches for an image corresponding to the phone number of the other party's mobile terminal in the phone book. If an image corresponding to the phone number of the other party's mobile terminal is found in the phone book, the controller 1301 extracts a face image from the found image using an image processing technique.

The controller 1301 compares the extracted face image to the stored images to search for one or more images including the extracted face image in the stored images. The controller 1301 preferentially displays the found images (that is, images corresponding to the other party's face image) among the stored images, and sequentially displays the remaining images except for the found images among the stored images.

If a plurality of images has been found, the mobile terminal preferentially displays a latest image among the found images based on times at which the individual images have been taken. For example, as illustrated in screen 703 of FIG. 7, if six images have been found, the mobile terminal may display the six images in the order of later times at which the individual images have been taken, from the upper left area to the lower right area on screen 703.

If no image corresponding to the phone number of the other party's mobile terminal is found, the controller 1301 searches for the other party's name corresponding to the phone number of the other party's mobile terminal or the other party's E-mail address in the phone book. The controller 1301 searches for one or more images corresponding to the other party's name in the stored images. The controller 1301 analyzes metadata of the stored images to determine whether metadata of each image includes the other party's name, and determines that the corresponding image is an image corresponding to the other party's name if the analyzed metadata of the image includes the other party's name.

Thereafter, the controller 1301 preferentially displays the found images (that is, images corresponding to the other party's name) among the stored images, and sequentially displays the remaining images except for the found images among the stored images.

If a plurality of images has been found, the controller 1301 preferentially displays a latest image among the found images based on times at which the individual images have been taken. For example, as illustrated in screen 703, if six images have been found, the controller 1301 may display the six images in the order of later times at which the individual images have been taken, from the upper left area to the lower right area in screen 703.

According to the fifth embodiment, the controller 1301 estimates a location of the other party's mobile terminal using at least one of GPS and IPS. Herein, GPS is used to estimate a location of the other party's mobile terminal using a satellite, and IPS is used to estimate a location of the other party's mobile terminal located in a short distance from a mobile terminal, such as by using Bluetooth, WiFi, or a LTE network. A technique of estimating the location of the other party's controller 1301 using at least one of GPS and IPS is well-known in the art, and further descriptions thereof will therefore be omitted.

Thereafter, the controller 1301 determines whether a predetermined condition is satisfied. The predetermined condition includes at least one of a distance between the mobile terminal and the other party's mobile terminal being equal to or shorter than a predetermined reference distance and a difference between a current time and a schedule time including the other party's name corresponding to the other party's mobile terminal being equal to or less than a predetermined reference value.

If the controller 1301 determines that the predetermined condition is satisfied, the controller 1301 searches for the other party's name corresponding to an ID of the other party's mobile terminal in a phone book. The ID of the other party's mobile terminal is a unique number allocated to the other party's mobile terminal in order to identify the other party's mobile terminal. For example, the ID of the other party's mobile terminal may be a phone number of the other party's mobile terminal.

If the other party's name corresponding to the ID of the other party's mobile terminal is found in the phone book, the controller 1301 determines whether an image corresponding to the other party's name is found in the phone book.

If an image corresponding to the other party's name is found in the phone book, the controller 1301 detects the image corresponding to the other party's name, and extracts a face image from the detected image using an image processing technique. Thereafter, the controller 1301 compares the extracted face image to one or more images stored in the memory unit 1307 to search for one or more images including the extracted face image in the stored images. The controller 1301 preferentially displays the found images (that is, images corresponding to the other party's face image) among the stored images, and sequentially displays the remaining images except for the found images among the stored images.

If no image corresponding to the other party's name is found in the phone book, the controller 1301 searches for one or more images corresponding to the other party's name in the images stored in the memory unit 1307, and then, proceeds to step 1017. The controller 1301 analyzes metadata of the stored images to determine whether metadata of each image includes the other party's name, and determines that the corresponding image corresponds to the other party's name if the analyzed metadata of the image includes the other party's name.

The controller 1301 preferentially displays the found images (that is, images corresponding to the other party's name) among the stored images, and sequentially displays the remaining images except for the found images among the stored images.

If a plurality of images has been found, the controller 1301 preferentially displays a latest image among the found images based on times at which the individual images have been taken. For example, as illustrated in screen 905, if six images have been found, the mobile terminal may display the six images in the order of later times at which the individual images have been taken, from the upper left area to the lower right area in screen 905.

According to the sixth embodiment, if a request for executing a gallery that is a picture management application is received from a user, the controller 1301 sequentially displays a plurality of images stored in the memory unit 1307. The controller 1301 determines whether at least two images of the plurality of displayed images have been selected by the user for a predetermined time period. When one of the displayed images has been touched by the user's finger or a stylus pen, the controller 1301 may determine that the corresponding image has been selected.

If the controller 1301 determines that at least two images have been selected, the controller 1301 analyzes the two images using an image processing technique to extracts face images from the two images. The controller 1301 compares the extracted face images to each other to determine whether the extracted faces images are the same image. If the controller 1301 determines that the extracted face images are the same image, the controller 1301 searches for one or more images including the face image in the images stored in the memory unit 1307.

Thereafter, the controller 1301 preferentially displays the found images, and sequentially displays the remaining images except for the found images among the stored images. For example, as illustrated in screen 1107 of FIG. 11, if twelve images are found, the controller 1301 may preferentially display the twelve images in the region 1109, and sequentially display the remaining images in the region 1111.

The controller 1301 determines whether any one(s) of the found images is an image already shared with the other party, based on a share log. If the controller 1301 determines that there is at least one shared image, the controller 1301 preferentially displays at least one image except for the shared image among the found images. The controller 1301 sequentially displays the remaining images except for the displayed image among the stored images. The controller 1301 may display the shared image for the last time.

If a plurality of images has been found, the controller 1301 preferentially displays a latest image among the found images based on times at which the individual images have been taken. For example, as illustrated in screen 1107, if twelve images have been found, the controller 1301 may display the twelve images in the order of later times at which the individual images have been taken, from the upper left area to the lower right area in the region 1109.

Therefore, according to the apparatus and method for displaying images in a mobile terminal, a user may quickly find his/her desired image from among a plurality of displayed images.

Also, according to the apparatus and method for displaying images based on a phone book and information regarding a currently executed event in a mobile terminal, a user may quickly find his/her desired image from among a plurality of displayed images.

The methods of displaying images in the mobile terminal according to the various embodiments of the present invention may be implemented as computer-readable code stored in a computer-readable recording medium. The computer-readable recording medium may include all types of recording devices in which data readable by a computer system is stored. Examples of the computer-readable recording medium include a Read Only Memory (ROM), a Random-Access Memory (RAM), an optical disk, a magnetic tape, a floppy disk, a hard disk, and a non-volatile memory. Further, the computer-readable recording medium may be implemented in the form of a carrier wave (for example, transmission through the Internet). In addition, the computer-readable recording medium may be distributed to computer systems over a network, in which computer-readable code may be stored and executed in a distributed manner.

While the invention has been shown and described with reference to embodiments thereof, it will be understood by those skilled in the art that various changes in form and details may be made therein without departing from the spirit and scope of the invention as defined by the appended claims and their equivalents.

What is claimed is:

1. An electronic device displaying an image, the electronic device comprising:
    a display configured to display images; and
    a processor configured to:
        receive a request to display at least one image from among a plurality of images which are pre-stored in the electronic device, while the electronic device communicates with a party using a message application;
        determine information related to the party using the message application, wherein the information related to the party includes an identifier of the party;
        determine a word included in a chat log of the messaging application related to the determined information of the party;
        select at least one image corresponding to the word from among the plurality of images;
        search at least one image in a phone book application corresponding to the identifier of the party from among the plurality of images;
        extract a face image from the searched at least one image; and
        control the display to preferentially display the extracted face image in a first region of a screen and sequentially display at least one remaining image, except the searched at least one image, from among the selected at least one image in the first region.

2. The electronic device of claim 1, wherein the processor is further configured to:
    search for a name corresponding to an identifier of the party used in the message application, and
    select an image corresponding to the name from among the plurality of images.

3. The electronic device of claim 1, wherein, if the electronic device, through Near Field Communication (NFC), is connected with a second electronic device of the determined party, the processor is further configured to:
    search for an identifier of the second electronic device, and
    select an image corresponding to the identifier from among the plurality of images.

4. The electronic device of claim 1, wherein, if the electronic device, through Near Field Communication (NFC), is connected with a second electronic device of the determined party, the processor is further configured to:
    receive NFC tag information including a phone number from the second electronic device,
    search for an image corresponding to the phone number in a phone book, extracting a face from an image, and
    select an image including the face from among the plurality of images.

5. The electronic device of claim 1, wherein, if the electronic device, through Near Field Communication (NFC), is connected with a second electronic device of the determined party, the processor is further configured to:
    receive NFC tag information including an Electronic mail (E-mail) address from the second electronic device,
    search for a name of the determined party corresponding to the E-mail address in the phone book, and
    select an image corresponding to the name from among the plurality of images.

6. The electronic device of claim 1, wherein the processor is further configured to determine whether a distance between the electronic device and a second electronic device is equal to or shorter than a predetermined distance, and
    wherein the processor is further configured to:
        search for an image corresponding to a name of the second electronic device in a phone book,
        if the distance between the electronic device and the second electronic device is equal to or shorter than the predetermined distance, extract a face from a found image, and
        select an image including the face from among the plurality of images.

7. The electronic device of claim 1, wherein the processor is further configured to determine whether a difference between a current time and a schedule time for an event associated with a name of the determined party corresponding to a second electronic device is equal to or less than a reference predetermined value, and
    wherein the processor is further configured to:
        search for an image corresponding to the name in a phone book,
        if the difference between the current time and the schedule time is equal to or less than the reference predetermined value, extract a face from a found image, and
        select an image including the face from among the plurality of images.

8. The electronic device of claim 1, wherein processor is further configured to:
    determine if at least two displayed images are selected within a time period,
    extract an image from the selected at least two images, if the at least two displayed images are selected within the time period, and
    select an image including the extracted image from among the plurality of images.

9. A method of displaying an image in an electronic device, the method comprising:
    receiving a request to display at least one image from among a plurality of images which are pre-stored in the electronic device, while the electronic device communicates with a party using a message application;
    determining information related to the party using the message application, wherein the information related to the party includes an identifier of the party;

determining a word included in a chat log of the messaging application related to the determined information of the party, other than a user of the electronic device, scheduled to communicate with the electronic device within a predetermined time;

selecting at least one image corresponding to the word from among the plurality of images;

searching at least one image in a phone book application corresponding to the identifier of the party from among the plurality of images;

extracting a face image from the searched at least one image; and preferentially displaying the extracted face image in a first region of a screen on a display and sequentially displaying at least one remaining image, except the searched at least one image, from among the selected at least one image in the first region.

10. The method of claim 9, wherein selecting the at least one image comprises:

searching for a name corresponding to an identifier of the determined party used in the message application; and selecting the at least one image corresponding to the name from among the plurality of images.

11. The method of claim 9, wherein selecting the at least one image comprises:

searching, if the electronic device is connected with a second electronic device of the determined party through Near Field Communication (NFC), for an identifier of the second electronic device; and selecting an image corresponding to the identifier from among the plurality of images.

12. The method of claim 9, wherein selecting the at least one image comprises:

receiving, if the electronic device is connected with a second electronic device of the determined party through Near Field Communication (NFC), NFC tag information including a phone number from the second electronic device;

searching for an image corresponding to the phone number in a phone book;

extracting a face from a found image; and selecting an image including the face from among the plurality of images.

13. The method of claim 9, wherein selecting the at least one image comprises:

receiving, if the electronic device is connected with a second electronic device of the determined party through Near Field Communication (NFC), NFC tag information including an Electronic mail (E-mail) address from the second electronic device;

searching for a name of the determined party corresponding to the E-mail address in a phone book; and selecting an image corresponding to the name from among the plurality of images.

14. The method of claim 9, wherein selecting the at least one image comprises:

determining whether a distance between the electronic device and a second electronic device is equal to or shorter than a predetermined distance;

searching for an image corresponding to a name of the second electronic device in a phone book, if the distance between the electronic device and the second electronic device is equal to or shorter than the predetermined distance;

extracting a face from a found image; and selecting an image including the face from among the plurality of images.

15. The method of claim 9, wherein selecting the at least one image comprises:

determining whether a difference between a current time and a schedule time for an event associated with a name of the determined party corresponding to a second electronic device is equal to or less than a reference predetermined value;

searching for an image corresponding to the name in a phone book, if the difference between the current time and the schedule time is equal to or less than the reference predetermined value;

extracting a face from a found image; and selecting an image including the face from among the plurality of images.

16. The method of claim 9, wherein selecting the at least one image comprises:

extracting, if at least two displayed images are selected within a predetermined time period, an image from the selected at least two images; and selecting an image including the extracted image from among the plurality of images.

* * * * *